US012785068B2

(12) United States Patent
Yoon et al.

(10) Patent No.: US 12,785,068 B2
(45) Date of Patent: Nov. 3, 2026

(54) SINGLE-LAYERED REFERENCE ELECTRODE

(71) Applicant: GM GLOBAL TECHNOLOGY OPERATIONS LLC, Detroit, MI (US)

(72) Inventors: Insun Yoon, Shelby Township, MI (US); Biqiong Wang, Madison Heights, MI (US); Fang Dai, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1094 days.

(21) Appl. No.: 17/903,883

(22) Filed: Sep. 6, 2022

(65) Prior Publication Data

US 2024/0079555 A1 Mar. 7, 2024

(51) Int. Cl.
*H01M 4/136* (2010.01)
*H01M 4/02* (2006.01)
(Continued)

(52) U.S. Cl.
CPC ......... *H01M 4/136* (2013.01); *H01M 4/5825* (2013.01); *H01M 4/625* (2013.01); *H01M 2004/028* (2013.01); *H01M 4/0402* (2013.01)

(58) Field of Classification Search
None
See application file for complete search history.

(56) References Cited

U.S. PATENT DOCUMENTS 6,488,721 B1 * 12/2002 Carlson ............... H01M 50/451 429/231.9
6,673,127 B1 1/2004 Allen et al.
(Continued)

FOREIGN PATENT DOCUMENTS

CN 112542567 A 3/2021
CN 112542568 A 3/2021
(Continued)

OTHER PUBLICATIONS

Delaporte, N., Ossonon, D.B., Zaghib, K., Belanger, D.—Fabrication of Current Collectors and Binder-Free Electrodes on Separators Used in Lithium-Ion Batteries, Batteries % Supercaps, 2020, pp. 638-646 (Year: 2020).*

(Continued)

*Primary Examiner* — Anca Eoff
(74) *Attorney, Agent, or Firm* — Harness, Dickey & Pierce, P.L.C.

(57) ABSTRACT

A reference electrode assembly includes a porous separator and a continuous electroactive material layer disposed on a surface of the porous separator. The electroactive material layer includes between about 20 wt. % and about 80 wt. % of an electroactive material and between about 20 wt. % and about 80 wt. % of an electrically conductive material. A loading density of the electroactive material is greater than or equal to about 0.01 mAh/cm$^2$ to less than or equal to about 0.1 mAh/cm$^2$. The electroactive material can be selected from the group consisting of: $LiFePO_4$ (LFP), lithium-aluminum alloys, lithium-tin alloys, and combinations thereof; and the electrically conductive material can be selected from the group consisting of: carbon black, carbon nanotubes, graphite, metal nano-micro particles, and combinations thereof. The continuous electroactive material layer is disposed on the surface of the separator using a one-step process selected from spin-coating electrode casting, ink-jet printing, and spray-coating.

18 Claims, 6 Drawing Sheets

(51) Int. Cl.

| | |
|---|---|
| ***H01M 4/04*** | (2006.01) |
| ***H01M 4/58*** | (2010.01) |
| ***H01M 4/62*** | (2006.01) |

(56) References Cited

U.S. PATENT DOCUMENTS

| | | | | |
|---|---|---|---|---|
| 9,252,421 | B1 * | 2/2016 | Erickson | H01M 10/052 |
| 10,020,456 | B2 | 7/2018 | Martin et al. | |
| 11,374,268 | B2 | 6/2022 | Gao et al. | |
| 2001/0008728 | A1 | 7/2001 | Turner et al. | |
| 2005/0079418 | A1 | 4/2005 | Kelley et al. | |
| 2011/0143181 | A1 * | 6/2011 | Ahn | H01M 50/457 156/244.11 |
| 2011/0227001 | A1 * | 9/2011 | Schulz-Dobrick | H01M 4/623 977/734 |
| 2013/0047423 | A1 * | 2/2013 | Miwa | H01G 9/042 977/773 |
| 2013/0143146 | A1 * | 6/2013 | Huang | H01M 50/417 428/315.7 |
| 2014/0315097 | A1 * | 10/2014 | Tan | H01M 10/052 429/300 |
| 2015/0050535 | A1 * | 2/2015 | Amiruddin | H01M 4/485 429/188 |
| 2017/0324119 | A1 | 11/2017 | Powell, Jr. et al. | |
| 2018/0062221 | A1 | 3/2018 | Koch et al. | |
| 2018/0287139 | A1 | 10/2018 | Xiao et al. | |
| 2019/0237822 | A1 | 8/2019 | Rober et al. | |
| 2021/0091369 | A1 | 3/2021 | Dadheech et al. | |
| 2021/0091424 | A1 | 3/2021 | Gao et al. | |
| 2021/0167383 | A1 | 6/2021 | Nelson et al. | |
| 2021/0273229 | A1 | 9/2021 | Wang et al. | |

FOREIGN PATENT DOCUMENTS

| | | | | |
|---|---|---|---|---|
| CN | 113314698 | A | 8/2021 | |
| CN | 117673509 | A | 3/2024 | |
| DE | 102021101894 | A1 | 9/2021 | |
| DE | 102021111703 | A1 | 6/2022 | |
| DE | 102021130703 | A1 | 7/2022 | |
| DE | 102023109784 | A1 | 3/2024 | |
| WO | WO-2017102852 | A1 * | 6/2017 | G01N 33/48721 |
| WO | WO-2018170926 | A1 | 9/2018 | |

OTHER PUBLICATIONS

Kim, J.Y., Seo, M.Y., Choi, J., Lee, Y.H., Kim, Y., Kang, S.H., Lee, Y.M., Lee, Y.-G .—Separator-Supported Electrode Configuration for Ultra-High Energy Density Lithium Secondary Battery, Adv. Energ. Mater, 2025, 15. 2403655 (Year: 2025).*

Kwon, H.T., Koo, B.-R., Lee, S.H.—Free-standing electrode/separator assembly architectures for improving energy density of Lithium-ion batteries, Journal of Energy Storage 125 (2025)116939 (Year: 2025).*

Zhao, W., Bai, M., Li, S., Tang, S., Tang, X., Wu, W., Sun, C., Yin, X., Zhou, J., Yuan, S., Ma, Y.—Integrated Thin Film Battery Design for Flexible Lithium Ion Storage: Optimizing the Compatibility of the Current Collector-Free Electrodes, Adv. Energ. Mater, 2019, 29, 1903542 (Year: 2019).*

BioAge Group, LLC, "Ahlstrom acquires 49% stake in US Li-ion battery separator company Porous Power Technologies." Green Car Congress, https://www.greencarcongress.com/2011/12/ahlstrom-20111212.html (Dec. 12, 2011).

Jawaharram, Gowtham Sriram, "How should I determine the various parameters for DC Magnetron Sputtering?" ResearchGate, https://www.researchgate.net/post/How-should-I-determine-the-various-parameters-for-DC-Magnetron-Sputtering (Dec. 30, 2014).

Ma, Tianyuan et al., "Revisiting the Corrosion of the Aluminum Current Collector in Lithium-Ion Batteries," J. Phys. Chem. Lett. (2017) 8, 5, pp. 1072-1077 (Published Feb. 16, 2017); DOI: 10.1021/acs.jpclett.6b02933.

Mozalev, A. et al., "The formation of nanoporous membranes from anodically oxidized aluminum and their application to Li rechargeable batteries," Electrochemica Acta 46 (2001), pp. 2825-2834.

Park, Dongjin et al., "Electrochemical Etching of Aluminum through Porous Alumina," Analytical Sciences (2001), vol. 17 Supplement, pp. a73-a76.

First Office Action for German Patent Application No. 102023109784.9 issued Jul. 31, 2025, with correspondence from Manitz Finsterwald Patent—und Rechtsanwaltspartnerschaft mbB summarizing Office Action; 5 pages.

* cited by examiner

SINGLE-LAYERED REFERENCE ELECTRODE

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator filled with a liquid or solid electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

In various aspects, it may be desirable to perform electrochemical analysis on batteries or certain components of the batteries during cycling. In many instances, for example, reference electrodes enable monitoring of individual potentials during cycling without interfering with battery operation. Common reference electrode substrates include a conductive coating or current collector layer disposed, for example using a sputtering process, on one or more surfaces of a separator substrate, and an electroactive material layer (including, for example, $LiFePO_4$ (LFP)) disposed on a surface of the conductive coating away from the separator substrate. The current collector layers are often non-porous, but permeable gold films. Such reference electrodes are often expensive and require complex manufacturing processes (including, for example, two-step fabrication processes). Accordingly, it would be desirable to develop improved reference electrode materials and structures, and methods for making the same, that can address these challenges.

SUMMARY

This section provides a general summary of the disclosure, and is not a comprehensive disclosure of its full scope or all of its features.

The present disclosure relates to single-layered reference electrodes and to electrochemical cells including the same, and also to methods of making and using the same.

In various aspects, the present disclosure provides a reference electrode assembly for an electrochemical cell. The reference electrode assembly may include a porous separator and a continuous electroactive material layer disposed on a surface of the porous separator. The electroactive material layer may include an electroactive material and an electrically conductive material.

In one aspect, the electrochemical material layer may include greater than or equal to about 20 wt. % to less than or equal to about 80 wt. % of the electroactive material and greater than or equal to about 20 wt. % to less than or equal to about 80 wt. % of the electrically conductive material.

In one aspect, the electroactive material may be selected from the group consisting of: $LiFePO_4$ (LFP), lithium-aluminum alloys, lithium-tin alloys, and combinations thereof.

In one aspect, the electrically conductive material may be selected from the group consisting of: carbon black, carbon nanotubes, graphite, metal nano-particles, metal micro-particles, and combinations thereof.

In one aspect, the electrically conductive material may be a first electrically conductive material, and the reference electrode may further include a second electrically conductive material.

In one aspect, the first and second electrically conductive materials may be independently selected from the group consisting of: carbon black, carbon nanotubes, graphite, metal nano-particles, metal micro-particles, and combinations thereof.

In one aspect, the first electrically conductive material may include carbon nanotubes, and the second electrically conductive material may be selected from the group consisting of: carbon black, graphite, metal nano-particles, metal micro-particles, and combinations thereof.

In one aspect, the reference electrode assembly may have an average thickness greater than or equal to about 500 nanometers to less than or equal to about 10 micrometers.

In one aspect, the continuous electroactive material layer may be disposed onto the surface of the separator using a one-step process selected from spin-coating electrode casting, ink-jet printing, and spray-coating.

In one aspect, a loading density of the electroactive material may be greater than or equal to about 0.01 $mAh/cm^2$ to less than or equal to about 0.1 $mAh/cm^2$.

In various aspects, the present disclosure provides an electrochemical cell that includes a first current collector; a positive electroactive material layer disposed on or near a surface of the first current collector, the positive electroactive material layer including a first electroactive material and having a first loading density greater than or equal to about 2 $mAh/cm^2$; a first separator disposed on or near a surface of the positive electroactive material layer opposite from the first current collector; a reference electroactive material layer disposed on a surface of the first separator opposite from the positive electroactive material, the reference electroactive material layer including a second electroactive material and an electrically conductive material and having a second loading density greater than or equal to about 0.01 $mAh/cm^2$ to less than or equal to about 0.1 $mAh/cm^2$; a second separator disposed on a surface of the reference electroactive material layer opposite from the first separator; a negative electroactive material layer disposed on or near a surface of the second separator opposite from the reference electroactive material layer, the negative electroactive material layer including a third electroactive material and having a third loading density greater than or equal to about 2 $mAh/cm^2$; and a second current collector disposed on or near a surface of the negative electroactive material layer opposite from the second separator.

In one aspect, the second electroactive material may be a reference electroactive material selected from the group consisting of: $LiFePO_4$ (LFP), lithium-aluminum alloys, lithium-tin alloys, and combinations thereof.

In one aspect, the electrically conductive material may be selected from the group consisting of: carbon black, carbon nanotubes, graphite, metal nano-particles, metal micro-particles, and combinations thereof.

In one aspect, the electrically conductive material may be a first electrically conductive material, and the reference electrode may further include a second electrically conductive material.

In one aspect, the first and second electrically conductive materials may be independently selected from the group consisting of: carbon black, carbon nanotubes, graphite, metal nano-particles, metal micro-particles, and combinations thereof.

In one aspect, the first electrically conductive material may include carbon nanotubes, and the second electrically conductive material may be selected from the group consisting of: carbon black, graphite, metal nano-particles, metal micro-particles, and combinations thereof.

In one aspect, the reference electroactive material layer may include greater than or equal to about 20 wt. % to less than or equal to about 80 wt. % of the second electroactive material. The positive electroactive material layer may include greater than or equal to about 70 wt. % to less than or equal to about 98 wt. % of the first electroactive material. The positive electroactive material layer may include an amount of the first electroactive material that is greater than an amount of the second electroactive material in the reference electroactive material layer. The negative electroactive material layer comprises greater than or equal to about 70 wt. % to less than or equal to about 98 wt. % of the third electroactive material. The negative electroactive material layer may include an amount of the third electroactive material that is greater than an amount of the second electroactive material in the reference electroactive material layer.

In various aspects, the present disclosure provides an electrochemical cell that includes a first separating layer, a second separating layer, and a continuous electroactive material layer disposed between and in contact with both of the first and second separating layers. The electroactive material layer may include an electroactive material and an electrically conductive material and may have a first loading density greater than or equal to about 0.01 mAh/cm$^2$ to less than or equal to about 0.1 mAh/cm$^2$.

In one aspect, the electrochemical cell may further include a positive electrode assembly disposed near an exposed surface of the first separating layer opposite from the continuous electroactive material layer. The positive electrode assembly may include a positive electroactive material layer and a first current collector. The positive electroactive material layer may have a second loading density greater than or equal to about 2 mAh/cm$^2$ and may be disposed between the first current collector and the exposed surface of the first separating layer.

In one aspect, the electrochemical cell may further include a negative electrode assembly disposed near an exposed surface of the second separating layer opposite from the continuous electroactive material layer. The negative electrode assembly may include a negative electroactive material layer and a second current collector. The negative electroactive material layer may have a third loading density greater than or equal to about 2 mAh/cm$^2$ and may be disposed between the second current collector and the exposed surface of the second separating layer.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
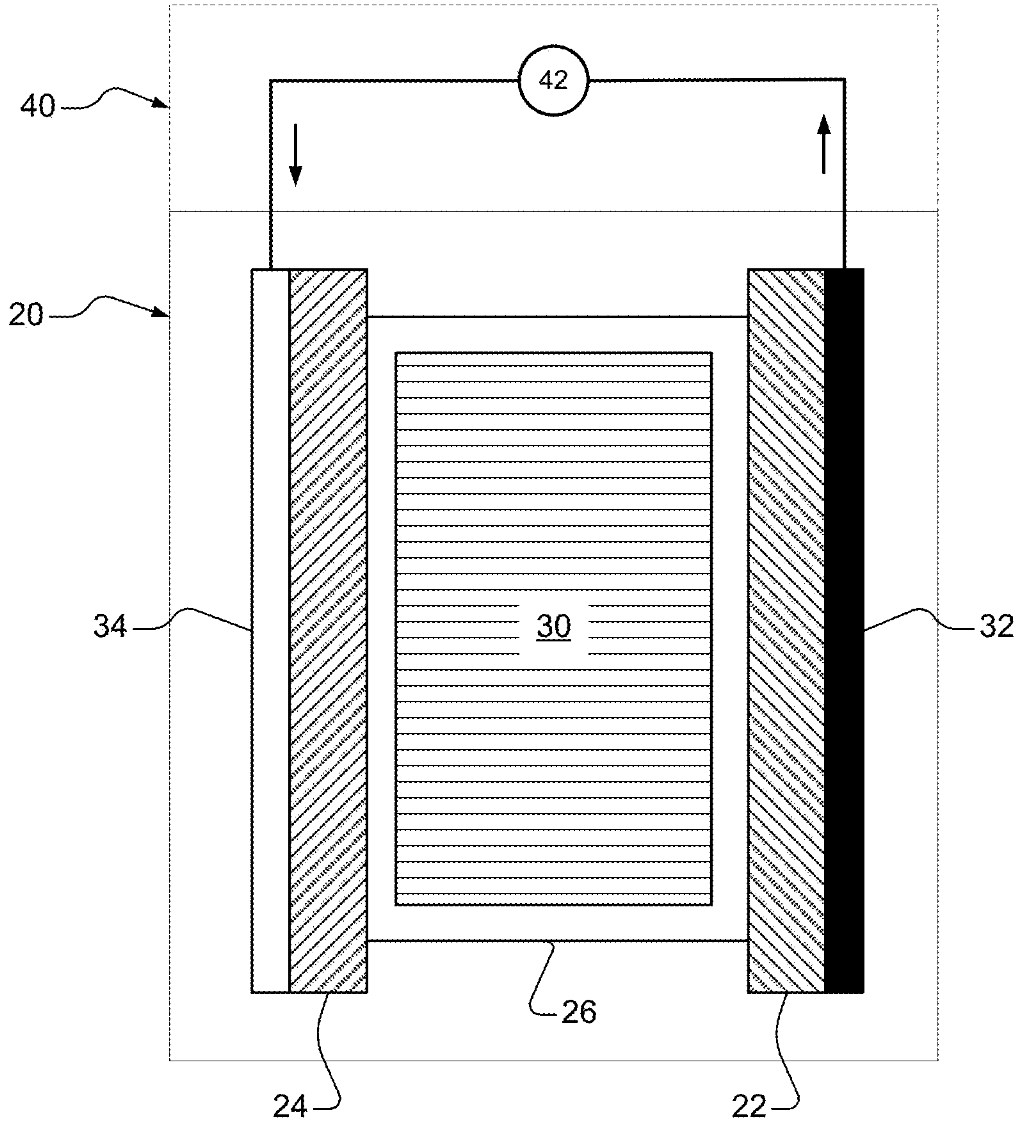
FIG. 1 is a schematic of an example electrochemical battery cell in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology relates to reference electrodes and to electrochemical cells including the same, and also to methods of forming and using the same. Electrochemical cells can be used in vehicle or automotive transportation applications (e.g., motorcycles, boats, tractors, buses, motorcycles, mobile homes, campers, and tanks). However, the present technology may also be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples detail below include a single positive electrode cathode and a single anode, the skilled artisan will recognize that the present teachings also extend to various other configurations, including those having one or more cathodes and one or more anodes, as well as various current collectors with electroactive layers disposed on or adjacent to one or more surfaces thereof.

An exemplary and schematic illustration of an electrochemical cell (also referred to as a battery) 20 is shown in FIG. 1. The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and/or the positive electrode 24, so as to form a continuous electrolyte network. In certain variations, the separator 26 may be formed by a solid-state electrolyte or a semi-solid-state electrolyte (e.g., gel electrolyte). For example, the separator 26 may be defined by a plurality of solid-state electrolyte particles. In the instance of solid-state batteries and/or semi-solid-state batteries, the positive electrode 24 and/or the negative electrode 22 may include a plurality of solid-state electrolyte particles. The plurality of solid-state electrolyte particles included in, or defining, the separator 26 may be the same as or different from the plurality of solid-state electrolyte particles included in the positive electrode 24 and/or the negative electrode 22.

A first current collector 32 (e.g., a negative current collector) may be positioned at or near the negative electrode 22. The first current collector 32 together with the negative electrode 22 may be referred to as a negative electrode assembly. Although not illustrated, the skilled artisan will appreciate that, in certain variations, negative electrodes 22 (also referred to as negative electroactive material layers) may be disposed on one or more parallel sides of the first current collector 32. Similarly, the skilled artisan will appreciate that, in other variations, a negative electroactive material layer may be disposed on a first side of the first current collector 32, and a positive electroactive material layer may be disposed on a second side of the first current collector 32. In each instance, the first current collector 32 may be a metal foil, metal grid or screen, or expanded metal comprising copper or any other appropriate electrically conductive material known to those of skill in the art.

A second current collector 34 (e.g., a positive current collector) may be positioned at or near the positive electrode 24. The second current collector 34 together with the positive electrode 24 may be referred to as a positive electrode assembly. Although not illustrated, the skilled artisan will appreciate that, in certain variations, positive electrodes 24 (also referred to as positive electroactive material layers) may be disposed on one or more parallel sides of the second current collector 34. Similarly, the skilled artisan will appreciate that, in other variations, a positive electroactive material layer may be disposed on a first side of the second current collector 34, and a negative electroactive material layer may be disposed on a second side of the second current collector 34. In each instance, the second electrode current collector 34 may be a metal foil, metal grid or screen, or expanded metal comprising aluminum or any other appropriate electrically conductive material known to those of skill in the art.

The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34). The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium-ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries and/or semi-solid state batteries that include solid-state electrolytes and/or solid-state electrolyte particles and/or semi-solid electrolytes and/or solid-state electroactive particles that may have assorted designs as known to those of skill in the art.

The size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. For example, in certain aspects, the electrolyte 30 may be a non-aqueous liquid electrolyte solution (e.g., >1 M) that includes a lithium salt dissolved in an organic solvent or a mixture of organic solvents. Numerous conventional non-aqueous liquid electrolyte 30 solutions may be employed in the battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC), vinylene carbonate (VC), and the like), linear carbonates (e.g., dimethyl carbonate (DMC), diethyl carbonate (DEC), ethylmethylcarbonate (EMC), and the like), aliphatic carboxylic esters (e.g., methyl formate, methyl acetate, methyl propionate, and the like), γ-lactones (e.g., γ-butyrolactone, γ-valerolactone, and the like), chain structure ethers (e.g., 1,2-dimethoxyethane, 1-2-diethoxyethane, ethoxymethoxyethane, and the like), cyclic ethers (e.g., tetrahydrofuran, 2-methyltetrahydrofuran, 1,3-dioxolane, and the like), sulfur compounds (e.g., sulfolane), and combinations thereof.

The separator 26 may be a porous separator having a porosity greater than or equal to about 30 vol. % to less than or equal to about 80 vol. %, and in certain aspects, optionally greater than or equal to about 40 vol. % to less than or equal to about 75 vol. %. For example, in certain instances, the separator 26 may be a microporous polymeric separator that includes a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic material and a heat-resistant material. For example, the separator 26 may also be admixed with the ceramic material and/or the heat-resistant material, or one or more surfaces of the separator 26 may be coated with the ceramic material and/or the heat-resistant material. In certain variations, the ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have an average thickness greater than or equal to about 1 micrometer or micron (μm) to less than or equal to about 50 μm, and in certain instances, optionally greater than or equal to about 1 μm to less than or equal to about 20 μm.

In various aspects, the porous separator 26 and/or the electrolyte 30 disposed in the porous separator 26 as illustrated in FIG. 1 may be replaced with a solid-state electrolyte ("SSE") and/or semi-solid-state electrolyte (e.g., gel) that functions as both an electrolyte and a separator. For example, the solid-state electrolyte and/or semi-solid-state electrolyte may be disposed between the positive electrode 24 and negative electrode 22. The solid-state electrolyte and/or semi-solid-state electrolyte facilitates transfer of lithium ions, while mechanically separating and providing electrical insulation between the negative and positive electrodes 22, 24. By way of non-limiting example, the solid-state electrolyte and/or semi-solid-state electrolyte may include a plurality of fillers, such as $LiTi_2(PO_4)_3$, $LiGe_2(PO_4)_3$, $Li_7La_3Zr_2O_{12}$, $Li_3xLa_{2/3}\text{-}xTiO_3$, $Li_3PO_4$, $Li_3N$, $Li_4GeS_4$, $Li_{10}GeP_2S_{12}$, $Li_2S—P_2S_5$, $Li_6PS_5Cl$, $Li_6PS_5Br$, $Li_6PS_5I$, $Li_3OCl$, $Li_{2.99}Ba_{0.005}ClO$, or combinations thereof. The semi-solid-state electrolyte may include a polymer host and a liquid electrolyte. The polymer host may include, for example, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), carboxymethyl cellulose (CMC), poly(vinyl alcohol) (PVA), polyvinylpyrrolidone (PVP), and combinations thereof. In certain variations, the semi-solid or gel electrolyte may also be found in the positive electrode 24 and/or the negative electrodes 22.

The negative electrode 22 is formed from a lithium host material that is capable of functioning as a negative terminal of a lithium-ion battery. In various aspects, the negative electrode 22 may be defined by a plurality of negative electroactive material particles. Such negative electroactive material particles may be disposed in one or more layers so as to define the three-dimensional structure of the negative electrode 22. The electrolyte 30 may be introduced, for example after cell assembly, and contained within pores of the negative electrode 22. For example, in certain variations, the negative electrode 22 may include a plurality of solid-state electrolyte particles. In each instance, the negative electrode 22 (including the one or more layers) may have an average thickness greater than or equal to about 0 nm to less than or equal to about 500 μm, optionally greater than or equal to about 1 μm to less than or equal to about 500 μm, and in certain aspects, optionally greater than or equal to about 10 μm to less than or equal to about 200 μm.

In various aspects, negative electrode 22 may include a lithium-containing negative electroactive material, such as a lithium alloy and/or a lithium metal. For example, in certain variations, the negative electrode 22 may be defined by a lithium metal foil. In other variations, the negative electrode 22 may include, for example only, carbonaceous negative electroactive materials (such as, graphite, hard carbon, soft carbon, and the like) and/or metallic negative electroactive materials (such as tin, aluminum, magnesium, germanium, and alloys thereof, and the like). In further variations, the negative electrode 22 may include a silicon-based negative electroactive material. In still further variations, the negative electrode 22 may be a composite electrode including a combination of negative electroactive materials. For example, the negative electrode 22 may include a first negative electroactive material and a second negative electroactive material. In certain variations, a ratio of the first negative electroactive material to the second negative electroactive material may be greater than or equal to about 5:95 to less than or equal to about 95:5. The first negative electroactive material may be a volume-expanding negative electroactive material including, for example, silicon, aluminum, germanium, and/or tin. The second negative electroactive material may include a carbonaceous negative electroactive material (e.g., graphite, hard carbon, and/or soft carbon). For example, in certain variations, the negative electroactive material may include a carbonaceous-silicon based composite including, for example, about 10 wt. % $SiO_x$ (where $0 \leq x \leq 2$) and about 90 wt. % graphite. In each instance, the negative electroactive material may be prelithiated.

In certain variations, the negative electroactive material may be optionally intermingled (e.g., slurry casted) with an electronically conductive material (i.e., conductive additive) that provide an electron conductive path and/or a polymeric binder material that improve the structural integrity of the negative electrode 22. For example, the negative electrode 22 may include greater than or equal to about 70 wt. % to less than or equal to about 98 wt. %, and in certain aspects, optionally greater than or equal to about 80 wt. % to less than or equal to about 95 wt. %, of the negative electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder.

Example polymeric binders include polyimide, polyamic acid, polyamide, polysulfone, polyvinylidene difluoride (PVdF), polytetrafluoroethylene (PTFE), polyacrylic acid (PAA), blends of polyvinylidene fluoride and polyhexafluoropropene, polychlorotrifluoroethylene, ethylene propylene diene monomer (EPDM) rubber, carboxymethyl cellulose (CMC), nitrile butadiene rubber (NBR), styrene-butadiene rubber (SBR), lithium polyacrylate (LiPAA), sodium polyacrylate (NaPAA), sodium alginate, and/or lithium alginate. Electronically conducting materials may include, for example, carbon-based materials, powdered nickel or other metal particles, or conductive polymers. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

The positive electrode 24 is formed from a lithium-based active material that is capable of undergoing lithium intercalation and deintercalation, alloying and dealloying, or plating and stripping, while functioning as the positive terminal of a lithium-ion battery. The positive electrode 24 can be defined by a plurality of electroactive material particles. Such positive electroactive material particles may be disposed in one or more layers so as to define the three-dimensional structure of the positive electrode 24. The electrolyte 30 may be introduced, for example after cell assembly, and contained within pores of the positive electrode 24. In certain variations, the positive electrode 24 may include a plurality of solid-state electrolyte particles. In each instance, the positive electrode 24 may have an average thickness greater than or equal to about 1 μm to less than or equal to about 500 μm, and in certain aspects, optionally greater than or equal to about 10 μm to less than or equal to about 200 μm.

In various aspects, the positive electroactive material includes a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material includes an olivine-type oxide represented by $LiMePO_4$, where Me is a transition metal, such as cobalt (Co), nickel (Ni), manganese (Mn), iron (Fe), aluminum (Al), vanadium (V), or combinations thereof. In still other variations, the positive electroactive material includes a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material includes a spinel-type oxide represented by $LiMe_2O_4$, where Me is a transition metal, such as cobalt (Co), nickel (Ni), manganese (Mn), iron (Fe), aluminum (Al), vanadium (V), or combinations thereof. In still other variations, the positive electroactive material includes a tavorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof. In still further variations, the positive electrode 24 may be a composite electrode including a combination of positive electroactive materials. For example, the positive electrode 24 may include a first positive electroactive material and a second electroactive material. A ratio of the first positive electroactive material to the second positive electroactive material may be greater than or equal to about 5:95 to less than or equal to about 95:5. In certain variations, the first and second electroactive materials may be independently selected from one or more layered oxides, one or more olivine-type oxides, one or more monoclinic-type oxides, one or more spinel-type oxide, one or more tavorite, or combinations thereof.

In each variation, the positive electroactive material may be optionally intermingled (e.g., slurry casted) with an electronically conductive material (i.e., conductive additive) that provide an electron conductive path and/or a polymeric binder material that improve the structural integrity of the positive electrode 24. For example, the positive electrode 24 may include greater than or equal to about 70 wt. % to less than or equal to about 98 wt. %, and in certain aspects, optionally greater than or equal to about 80 wt. % to less than or equal to about 97 wt. %, of the positive electroactive material; greater than or equal to 0 wt. % to less than or equal to about 30 wt. %, and in certain aspects, optionally greater than or equal to about 0.5 wt. % to less than or equal to about 10 wt. %, of the electrically conducting material; and greater than or equal to 0 wt. % to less than or equal to about 20 wt. %, and in certain aspects, optionally greater than or equal to about 0.5 wt. % to less than or equal to about 10 wt. %, of the polymeric binder. The conductive additive and/or binder material as included in the positive electrode 24 may be the same as or different from the conductive additive and/or binder material as included in the negative electrode 22.

Figure 2:
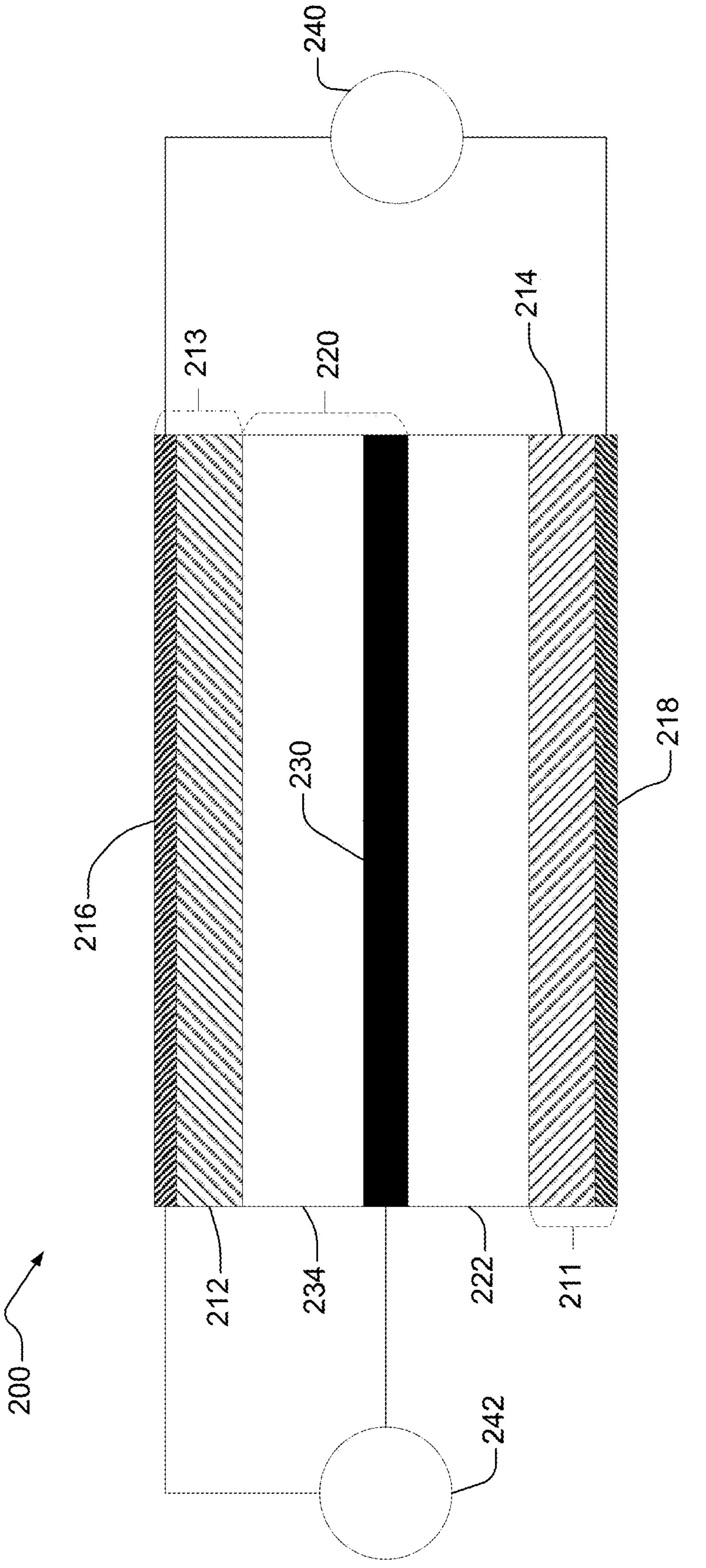
FIG. 2 is an illustration of an example electrochemical battery cell including a reference electrode in accordance with various aspects of the present disclosure.

It may be desirable to perform electrochemical analyses of electrodes, like the positive electrode 24 and/or the negative electrode 22 illustrated in FIG. 1. For example, certain electrochemical analyses may help to produce calibrations for control systems in Hybrid Electric Vehicles ("HEVs") and Electric Vehicles ("EVs") including with respect to fast charge, lithium plating, state of charge, and power estimation. In various aspects, electrodes may be analyzed using reference electrodes disposed with the positive and negative electrodes in the electrochemical cell. For example, FIG. 2 illustrates an example electrochemical cell 200 that includes a reference electrode assembly 220 disposed between a positive electrode assembly 211 (including a positive electrode or electroactive material layer 214 and a positive electrode current collector 218) and a negative electrode assembly 213 (including a negative electrode or electroactive material layer 212 and a negative electrode current collector 216). The reference electrode assembly 220 may enable monitoring of individual electrode potentials during cell cycling. For example, in certain variations, the individual potentials may be detected during operation of a vehicle as part of regular vehicle diagnostics and used in vehicle control algorithms to improve cell performance such as by raising anode potentials to decrease lithium plating.

As illustrated, the reference electrode assembly 220 may be a include a single-layered reference electrode 230 disposed on or adjacent to a first surface of a first separator 234. The reference electrode 230 is referred to as a single-layered reference electrode 230 because it omits a conductive coating or current collector layer as commonly disposed between a reference electrode and an adjoining separator. In the present instance, as illustrated, the first separator 234 may physically separate the electroactive material layer 230 and the negative electrode assembly 213, and the first surface of the first separator 234 may oppose the positive electrode assembly 211. The electrochemical cell 200 may also include a second separator 222 that physically separates the single-layered reference electrode 230 and the positive electrode assembly 211. Although not illustrated, it should be appreciated that, in certain variations, the first separator 234 may instead be disposed between the electroactive material layer 230 and the positive electrode assembly 211, while the second separator 222 is disposed between the single-layered reference electrode 230 and the negative electrode assembly 213. That is, the single-layered reference electrode 230 may be disposed on a second surface of the first separator 234 that opposes the negative electrode assembly 213. In each instance, the first and second separators 234, 222 may be the same or different. In certain variations, the first and second separators 234, 222 may be porous layers like the separator 26 illustrated in FIG. 1. In other variations, the first and second separators 234, 222 may be solid or semi-solid separators or electrolyte layers as detailed above in the context of the separator 26 illustrated in FIG. 1.

The single-layered reference electrode 230 may include an electroactive material dispersed with an electrically conductive material or filler to define the three-dimensional structure of the single-layered reference electrode 230. For example, the single-layered reference electrode 230 may include greater than or equal to about 20 wt. % to less than or equal to about 80 wt. %, optionally greater than or equal to about 30 wt. % to less than or equal to about 60 wt. %, and in certain aspects, optionally about 40 wt. %, of the electroactive material; and greater than or equal to about 20 wt. % to less than or equal to about 80 wt. %, optionally greater than or equal to about 40 wt. % to less than or equal to about 70 wt. %, and in certain aspects, optionally about 60 wt. %, of the conductive material. Notably, an amount of the electroactive material in the single-layer reference electrode 230 is less an amount of the positive electroactive material in the positive electrode 214 and also an amount of the negative electroactive material in the negative electrode 212. That is, high energy loading is not required for the electroactive material defining the single-layered reference electrode 230. For example, the electroactive material in the single-layered reference electrode 230 may have a loading density greater than or equal to about 0.01 mAh/cm$^2$ to less than or equal to about 0.1 mAh/cm$^2$, while the positive and negative electrodes may have electroactive material loading densities greater than or equal to about 2 mAh/cm$^2$.

The electroactive material of the single-layered reference electrode 230 should have stable potential and chemistry and has no preference as for a positive electroactive material or a negative electroactive material. The electroactive material may be provided as a plurality of electroactive material particles and may include, for example, $LiFePO_4$ (LFP), lithium-aluminum alloys, lithium-tin alloys, and combinations thereof.

The electrically conductive material may have minimal electrochemical reactivity such that the single-layered reference electrode 230 is electrochemically stable and has minimum influence on the electrochemical cell 200. In certain variations, the electrically conductive material may include, for example, carbon black, carbon nanotubes, graphite, metal nano-particles, metal micro-particles (including, for example, nickel, copper, aluminum, and/or silver), and the like. In certain variations, the electrically conductive material may include a combination of electrically conductive materials. For example, the single-layered reference electrode 230 may include first electrically conductive material and a second electrically conductive material. For example, the electrically conductive material may include greater than or equal to about 0 wt. % to less than or equal to about 100 wt. %, and in certain aspects, optionally greater than or equal to about 30 wt. % to less than or equal to about 70 wt. %, of the first electrically conductive material; and greater than or equal to about 0 wt. % to less than or equal to about 100 wt. %, and in certain aspects, optionally greater than or equal to about 30 wt. % to less than or equal to about 70 wt. %, of the second electrically conductive material. The first and second electrically conductive materials may be independently selected from carbon black, carbon nanotubes, graphene, metal nano-particles, metal micro-particles (such as nickel, copper, aluminum, and/or silver), and the like. For example, in certain variations, the first electrically conductive material may include carbon nanotubes, and the second electrically conductive material may be selected from carbon black, graphene, metal nano-particles, metal micro-particles (such as nickel, copper, aluminum, and/or silver), and the like.

In each variation, the single-layered reference electrode 230 may have an average thickness greater than or equal to about 500 nanometers (nm) to less than or equal to about 10 mm, and in certain aspects, optionally greater than or equal to about 1 mm to less than or equal to about 5 mm, and be a substantially continuous layer that coats the first surface of a first separator 234. For example, the single-layered reference electrode 230 may cover greater than or equal to about 85%, optionally greater than or equal to about 90%, optionally greater than or equal to about 95%, optionally greater than or equal to about 98%, optionally greater than or equal to about 99%, and in certain aspects, optionally greater than or equal to about 99.5%, of a total surface area of the first surface of the first separator 234. The single-layered reference electrode 230 may coat and/or occludes pores of the first surface of the first separator 234.

The single-layered reference electrode 230 may be prepared using a one-step process, like spin-coating (e.g., at 1,500 rpm), electrode casting, ink-jet printing, and/or spray-coating. The one-step process may readily facilitate formation of patterned reference electrode, for example, because the one-step fabrication processes do not require the physical masked metal layer deposition and pattern alignment during subsequent reference electrode composite deposition that is often used during processes for forming traditional multilayered reference electrodes. Pattern reference electrode in the current instance can monitor potential values of positive and negative electrodes separately and/or at a location of interest (e.g., edge of electrode or the center of electrode), which can further help real-time diagnostics and control such as by avoiding excessive non-uniform state of charge.

By way of example only, in certain variations, a reference electrode assembly consisting of a single-layered reference electrode (comprising, for example, about 40 wt. % of $LiFePO_4$ (LFP), about 25 wt. % of single-walled carbon nanotubes, and about 35% of SuperP) on a surface of a separator (comprising, for example, polypropylene, polyethylene, polyamides, polyimides, and/or ceramic fillers (such as fused silica)) may have a total thickness of about 5 μm, a sheet resistance of about 20 Ω/sq, and a resistivity of about $E^{-4}$ Ω·cm. By way of comparison, a reference electrode assembly consisting of a current collector layer (comprising, for example, nickel) on a surface of a separator (comprising, for example, polypropylene, polyethylene, polyamides, polyimides, and/or ceramic fillers (such as fused silica)) may have a total thickness of about 170 nm, a sheet resistance of about 14.9 Ω/sq, and a resistivity of about 1.8 $E^{-4}$ Ω·cm; a reference electrode consisting of a current collector layer (comprising, for example, aluminum) on a surface of a separator (comprising, for example, polypropylene, polyethylene, polyamides, polyimides, and/or ceramic fillers (such as fused silica)) may have a total thickness of about 170 nm, a sheet resistance of about 0.8 Ω/sq, and a resistivity of about 9.6 $E^{-6}$ Ω·cm; and a reference electrode consisting of a conductive layer (comprising, for example, carbon nanotubes) on a surface of a separator (comprising, for example, polypropylene, polyethylene, polyamides, polyimides, and/or ceramic fillers (such as fused silica)) may have a sheet resistance of about 2.9 Ω/sq and a resistivity of about $E^{-5}$ Ω·cm. By way of this comparison, it can be understood that conductive fillers can provide comparable conductivity to thin metal films prepared by sputter deposition. Moreover, even conductive filler and electroactive material composite layer has sufficient in-plane conductivity.

With renewed reference to FIG. 2, the positive electrode 214 may be like the positive electrode 24 illustrated in FIG. 1, the positive electrode current collector 218 may be like the positive electrode current collector 234 illustrated in FIG. 1, the negative electrode 212 may be like the negative electrode 22 illustrated in FIG. 1, and the negative electrode current collector 216 may be like the negative electrode current collector 32 illustrated in FIG. 1. The positive electrode assembly 211, the negative electrode assembly 213, the reference electrode assembly 220, and the second separator 222 may be each imbibed with an electrolyte, like the electrolyte 30 illustrated in FIG. 1.

As illustrated in FIG. 2, a first measurement device meter 240 may be electrically connected to the negative electrode 212 (through the negative electrode current collector 216) and to the positive electrode 214 (through the positive electrode current collector 218) so as to detect a potential between the negative and positive electrodes 212, 214. A second measurement device, such as a second voltage meter 242 may be electrically connected to the negative electrode 212 (through the negative electrode current collector 216) and the reference electrode assembly 220 (through current collector portion 230) to detect a potential difference between the negative electrode 212 and the reference electrode assembly 220. Because characteristics of the reference electrode assembly 220, and more specifically about the single-layered reference electrode 230, are known (e.g., the reference electrode assembly 220 has a constant known potential), measurements by the second voltage meter 242 may be used to determined individual potentials of the negative electrode 212 and the individual potential of the positive electrode 214 can be determined using the individual potentials of the negative electrode 212.

Certain features of the current technology are further illustrated in the following non-limiting examples.

Example 1

Example batteries and battery cells may be prepared in accordance with various aspects of the present disclosure. For example, a first example cell 310 may include a reference electrode assembly having a single-layer reference electrode and separator as illustrated in FIG. 2. The single-layer reference electrode of the first example cell 310 may include $LiFePO_4$ (LFP) as the electroactive material and single wall carbon nano tubes and/or carbon black as the electrically conductive materials. The separator may be a polymeric separator or a polymer/ceramic composite separator. The comparative cell 320 may include a reference electrode assembly including a current collector layer (for example, an aluminum foil) disposed between the reference electrode electroactive material layer including $LiFePO_4$ (LFP) and the reference electrode separator (being a polymeric separator or a polymer/ceramic composite separator).

Figure 3A:
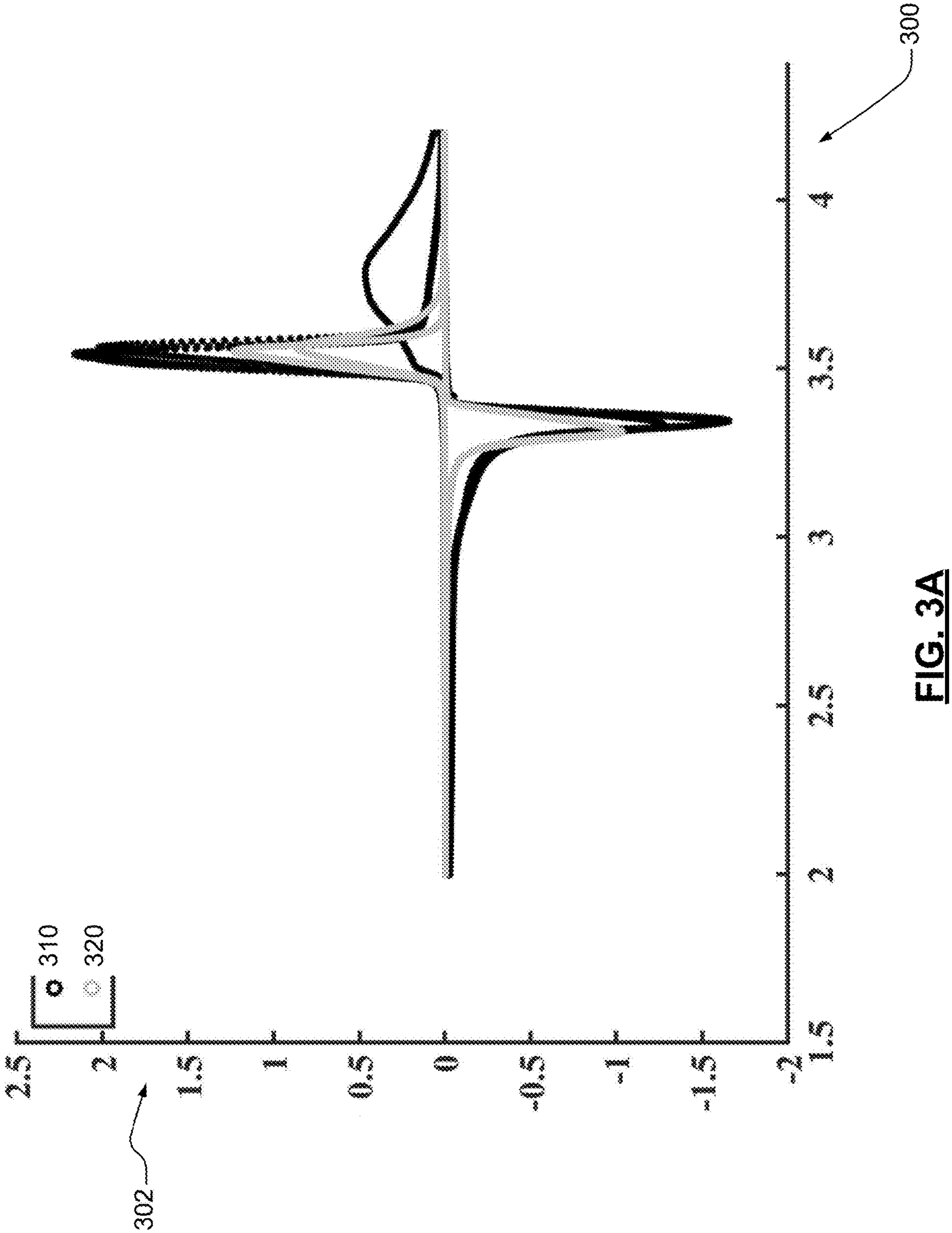
FIG. 3A is a graphical illustration demonstrating redox reaction potentials of an example cell including a reference electrode in accordance with various aspects of the present disclosure.

FIG. 3A is a graphical illustration demonstrating redox potentials of the example cell 310 as compared to the comparative cell 320, where the x-axis 300 represents voltage (V), and the y-axis 302 represents current (mA). As illustrated, the single layered design of the reference electrode as included in the example cell 310 shows the sample redox potential location as compared to the comparative cell 320.

Figure 3B:
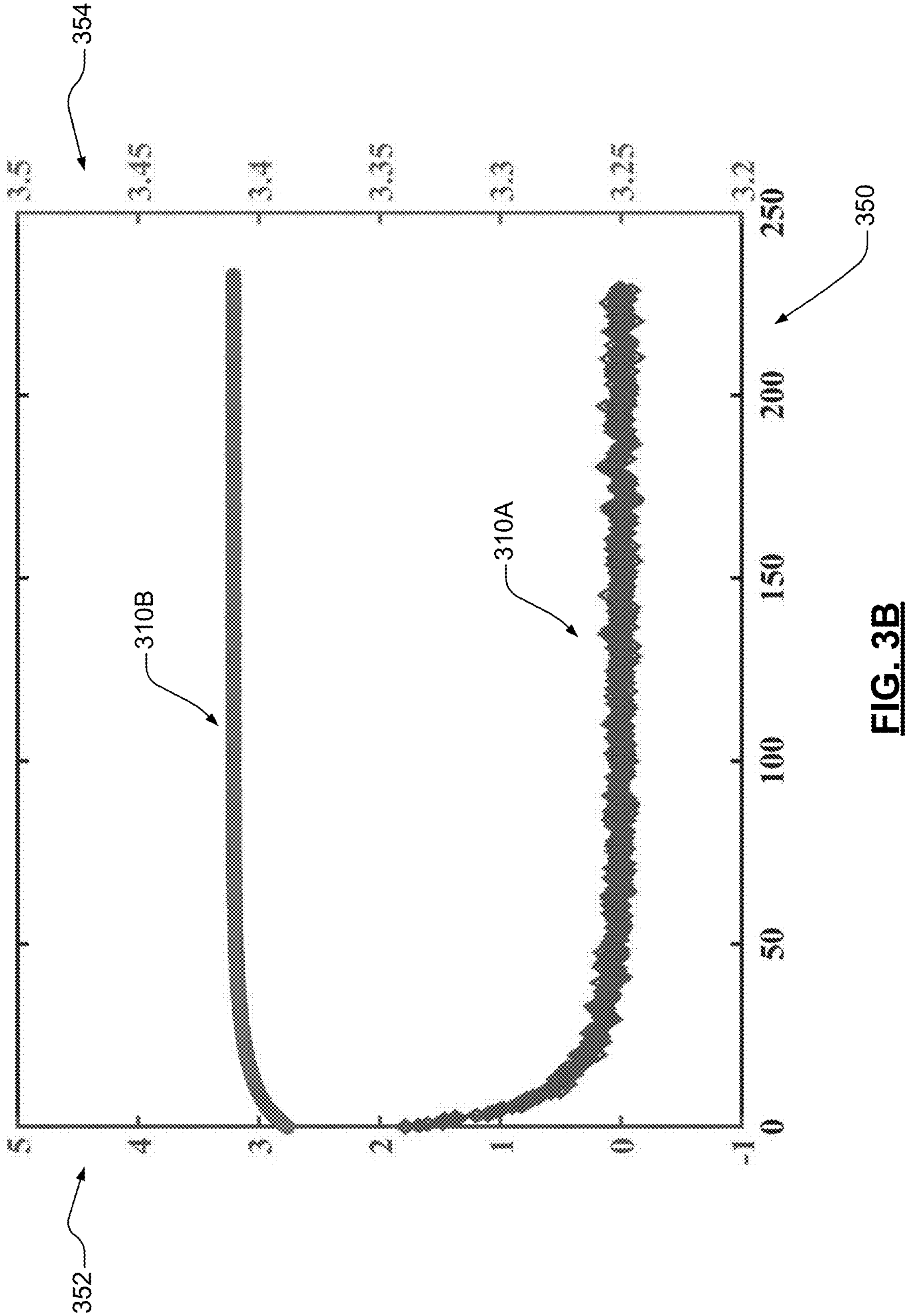
FIG. 3B is a graphical illustration demonstrating open circuit potential evolution of an example cell including a reference electrode in accordance with various aspects of the present disclosure.

FIG. 3B is a graphical illustration demonstrating the open circuit potential evolution of the example cell 310, where the x-axis 350 represents time (hour), the $y_1$-axis 352 represents potential change rate (mA/hr), and the $y_2$-axis 354 represents reference electrode potential. Reference line 310A represents the potential change rate of the example cell 310, while reference line 310B represents the reference electrode potential of the example cell 310. As illustrated, the potential of the single-layer reference electrode as included in the example cell 310 remains steady for extended time periods.

Example 2

Example batteries and battery cells may be prepared in accordance with various aspects of the present disclosure. For example, a first example cell 410 may include a reference electrode assembly having a single-layer reference electrode and separator as illustrated in FIG. 2. The single-layer reference electrode of the first example cell 410 may include $LiFePO_4$ (LFP) and as the electroactive material and single wall carbon nano tubes and/or carbon black as the electrically conductive materials. The comparative cell 420 may include a reference electrode assembly including a current collector layer (for example, an aluminum foil) disposed between the reference electrode electroactive material layer including $LiFePO_4$ (LFP) and the reference electrode separator.

Figure 4A:
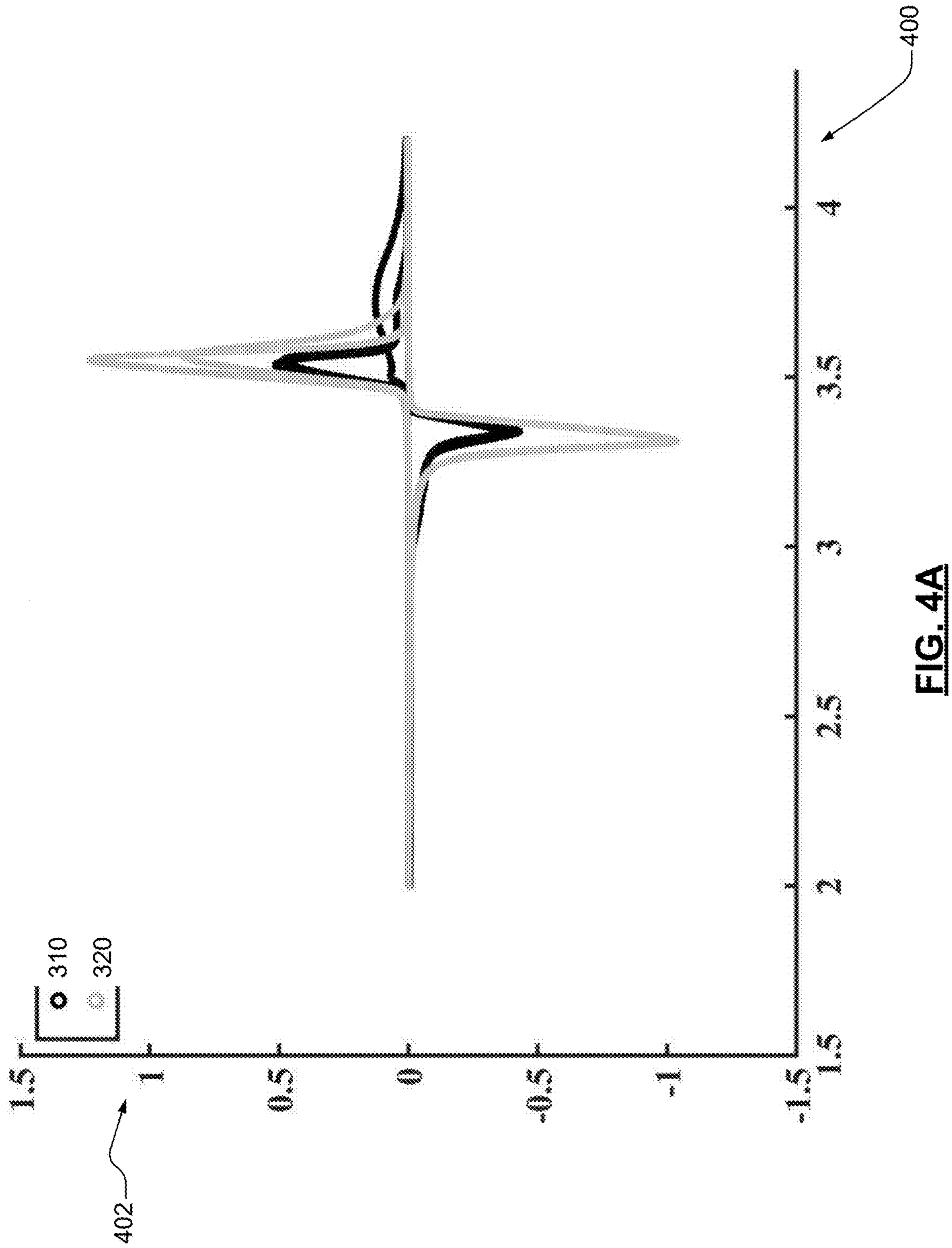
FIG. 4A is a graphical illustration demonstrating redox reaction potentials of another example cell including a reference electrode in accordance with various aspects of the present disclosure.

FIG. 4A is a graphical illustration demonstrating redox potentials of the example cell 410 as compared to the comparative cell 420, where the x-axis 400 represents voltage (V), and the y-axis 402 represents current (mA). As illustrated, . . . the single layered design of the reference electrode of the example cell 410 show the sample redox potential location as compared to the comparative cell 420.

Figure 4B:
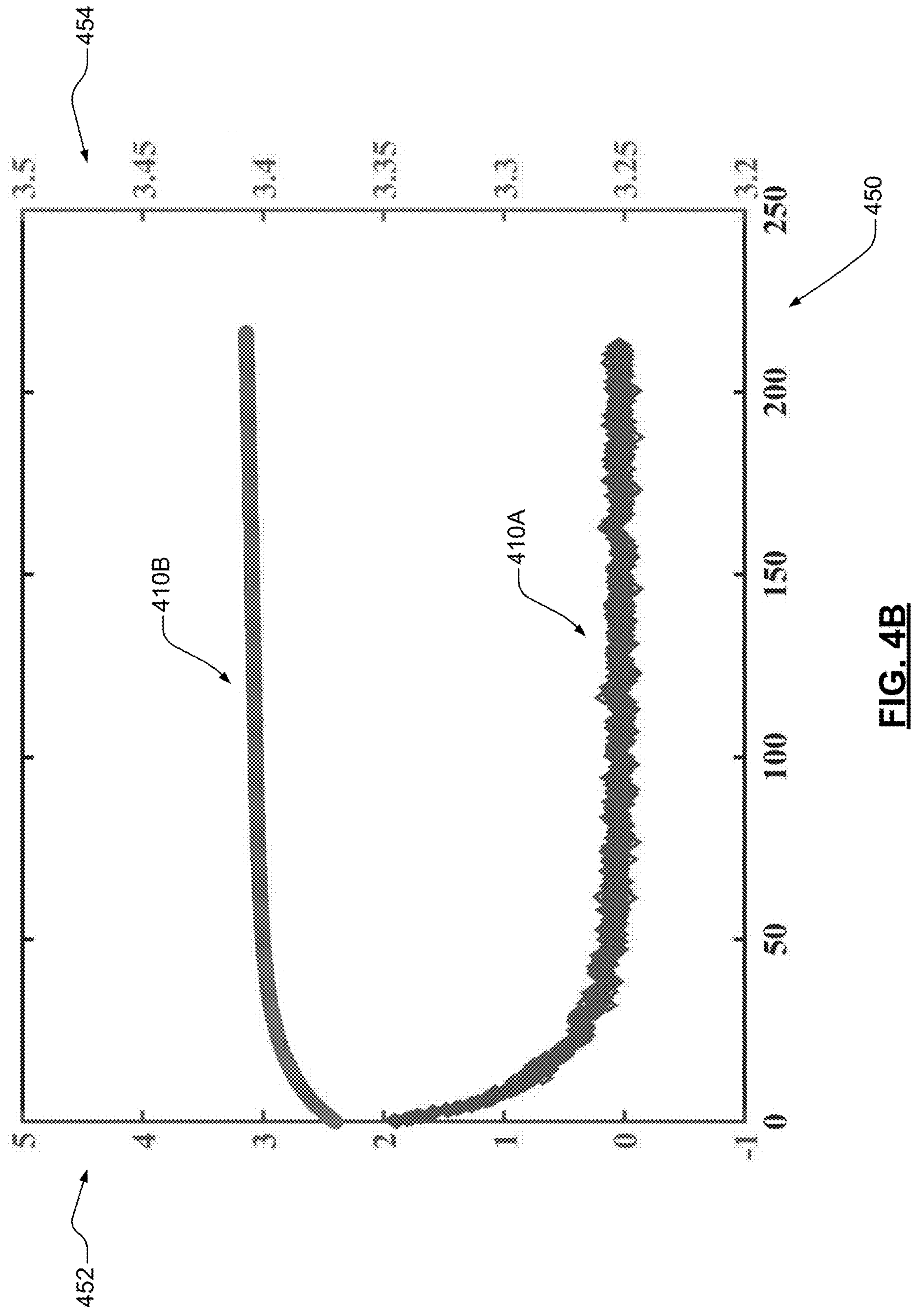
FIG. 4B is a graphical illustration demonstrating open circuit potential evolution of an example cell including a reference electrode in accordance with various aspects of the present disclosure.

FIG. 4B is a graphical illustration demonstrating open circuit potential evolution of the example cell 410, where the x-axis 450 represents time (hour), the $y_1$-axis 452 represents potential change rate (mA/hr), and the $y_2$-axis 454 represents reference electrode potential. Reference line 410A represents the potential change rate of the example cell 410, while reference line 410B represents the reference electrode potential of the example cell 410. As illustrated, the potential of the single-layer reference electrode as included in the example cell 410 remains steady for extended time periods.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A reference electrode assembly for an electrochemical cell, the reference electrode assembly comprising:

a porous separator; and a continuous electroactive material layer disposed on a surface of the porous separator, the electroactive material layer comprising greater than or equal to about 30 wt. % to less than or equal to about 60 wt. % of an electroactive material and greater than or equal to about 40 wt. % to less than or equal to about 70 wt. % of an electrically conductive material, the electrically conductive material selected from the group consisting of: nickel, copper, aluminum, silver, or any combination thereof.

2. The reference electrode assembly of claim 1, wherein the electroactive material is selected from the group consisting of: $LiFePO_4$ (LFP), lithium-aluminum alloys, lithium-tin alloys, and combinations thereof.

3. The reference electrode assembly of claim 1, wherein the electrically conductive material is a first electrically conductive material and the continuous electroactive material layer further comprises a second electrically conductive material selected from the group consisting of: carbon black, carbon nanotubes, graphite, and combinations thereof.

4. The reference electrode assembly of claim 3, wherein the second electrically conductive material comprises carbon nanotubes, and the continuous electroactive material further comprises a third electrically conductive material is selected from the group consisting of: carbon black, graphite, and combinations thereof.

5. The reference electrode assembly of claim 1, wherein the reference electrode assembly has an average thickness greater than or equal to about 500 nanometers to less than or equal to about 10 micrometers; and a loading density of the electroactive material is greater than or equal to about 0.01 $mAh/cm^2$ to less than or equal to about 0.1 $mAh/cm^2$.

6. The reference electrode assembly of claim 1, wherein the continuous electroactive material layer is disposed onto the surface of the separator using a one-step process selected from spin-coating electrode casting, ink-jet printing, and spray-coating.

7. The reference electrode assembly of claim 1, wherein the electrically conductive material selected from the group consisting of: nickel, aluminum, or any combination thereof.

8. The reference electrode assembly of claim 1, wherein the electrochemical material layer comprises about 40 wt. % of the electroactive material and about 60 wt. % of the electrically conductive material.

9. The reference electrode assembly of claim 1, wherein the continuous electroactive material layer is a single-layered electroactive material layer.

10. The reference electrode assembly of claim 1, wherein the porous separator is a first porous separator, the continuous electroactive material layer is a first continuous electroactive material layer, and the reference electrode is configured to be disposed between a second porous separator and second continuous electroactive material layer.

11. The reference electrode assembly of claim 1, wherein the reference electrode consists essentially of the porous separator and the continuous electroactive material layer, the continuous electroactive material layer consisting essentially of the electroactive material and the electrically conductive material.

12. An electrochemical cell comprising:

a first current collector;

a positive electroactive material layer disposed on or near a surface of the first current collector, the positive electroactive material layer comprising a first electroactive material and having a first loading density greater than or equal to about 2 $mAh/cm^2$;

a first separator disposed on or near a surface of the positive electroactive material layer opposite from the first current collector;

a reference electroactive material layer disposed on a surface of the first separator opposite from the positive electroactive material, the reference electroactive material layer comprising greater than or equal to about 30 wt. % to less than or equal to about 60 wt. % of a second electroactive material and greater than or equal to about 40 wt. % to less than or equal to about 70 wt. % of an electrically conductive material selected from the group consisting of: nickel, copper, aluminum, silver, or any combination thereof and having a second loading density greater than or equal to about 0.01 $mAh/cm^2$ to less than or equal to about 0.1 $mAh/cm^2$;

a second separator disposed on a surface of the reference electroactive material layer opposite from the first separator;

a negative electroactive material layer disposed on or near a surface of the second separator opposite from the reference electroactive material layer, the negative electroactive material layer comprising a third electroactive material and having a third loading density greater than or equal to about 2 $mAh/cm^2$; and a second current collector disposed on or near a surface of the negative electroactive material layer opposite from the second separator.

13. The electrochemical cell of claim 12, wherein the second electroactive material is a reference electroactive material selected from the group consisting of: $LiFePO_4$ (LFP), lithium-aluminum alloys, lithium-tin alloys, and combinations thereof.

14. The electrochemical cell of claim 12, where the electrically conductive material is a first electrically conductive material and the reference electroactive material layer further comprises a second electrically conductive material selected from the group consisting of: carbon black, carbon nanotubes, graphite, and combinations thereof.

15. The electrochemical cell of claim 14, wherein the second electrically conductive material comprises carbon nanotubes, and the reference electroactive material layer further comprises a third electrically conductive material selected from the group consisting of: carbon black, graphite, and combinations thereof.

16. The electrochemical cell of claim 12, wherein;

the positive electroactive material layer comprises greater than or equal to about 70 wt. % to less than or equal to about 98 wt. % of the first electroactive material, the positive electroactive material layer comprising an amount of the first electroactive material that is greater than an amount of the second electroactive material in the reference electroactive material layer; and the negative electroactive material layer comprises greater than or equal to about 70 wt. % to less than or equal to about 98 wt. % of the third electroactive material, the negative electroactive material layer comprising an amount of the third electroactive material that is greater than an amount of the second electroactive material in the reference electroactive material layer.

17. An electrochemical cell comprising:

a first separating layer;

a second separating layer; and a continuous electroactive material layer disposed between and in contact with both of the first and second separating layers, the electroactive material layer comprising greater than or equal to about 30 wt. % to less than or equal to about 60 wt. % of an electroactive material and greater than or equal to about 40 wt. % to less than or equal to about 70 wt. % of an electrically conductive material selected from the group consisting of: nickel, copper, aluminum, silver, or any combination thereof and having a first loading density greater than or equal to about 0.01 $mAh/cm^2$ to less than or equal to about 0.1 $mAh/cm^2$.

18. The electrochemical cell of claim 17, further comprising:

a positive electrode assembly disposed near an exposed surface of the first separating layer opposite from the continuous electroactive material layer, the positive electrode assembly comprising a positive electroactive material layer and a first current collector, the positive electroactive material layer having a second loading density greater than or equal to about 2 $mAh/cm^2$ and being disposed between the first current collector and the exposed surface of the first separating layer; and a negative electrode assembly disposed near an exposed surface of the second separating layer opposite from the continuous electroactive material layer, the negative electrode assembly comprising a negative electroactive material layer and a second current collector, the negative electroactive material layer having a third loading density greater than or equal to about 2 $mAh/cm^2$ and being disposed between the second current collector and the exposed surface of the second separating layer.

* * * * *